INVENTOR
CHU PING WANG
BY Charles P. Boberg
ATTORNEY

FIG. 4
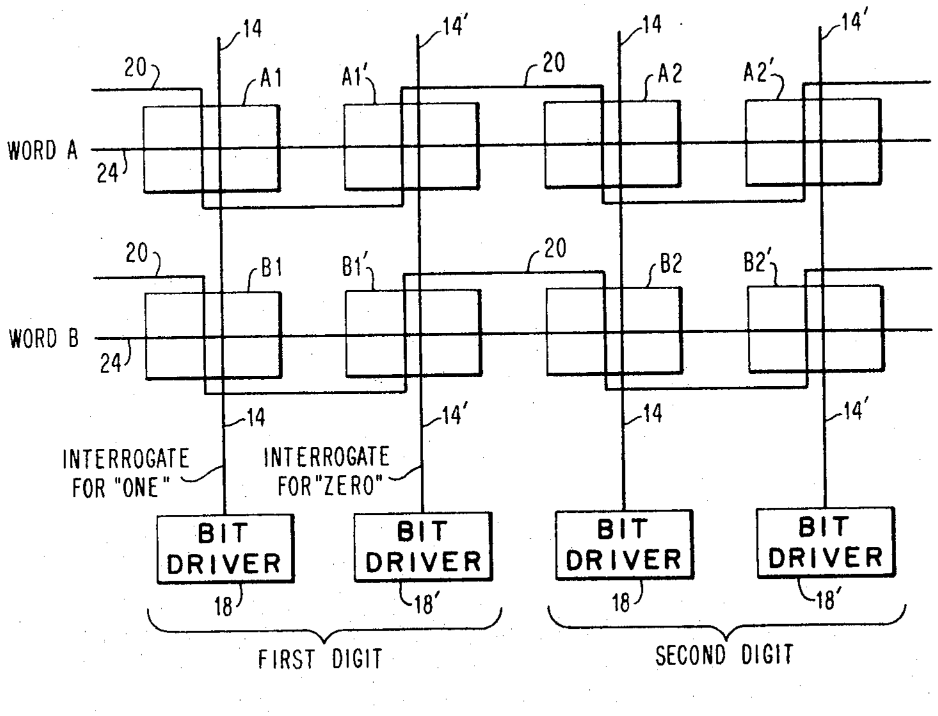
FIG. 5
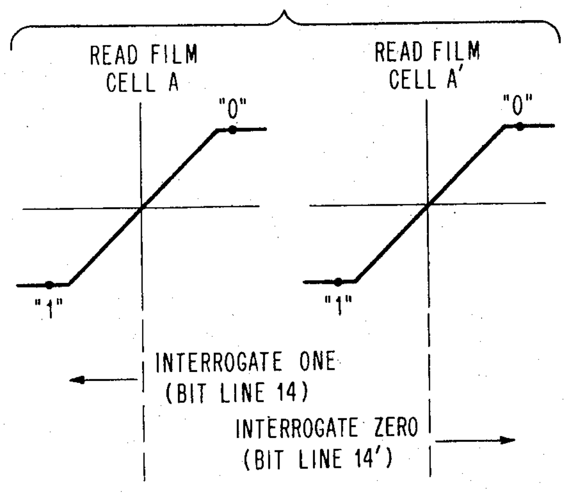
FIG. 6
| INTERROGATE | STORED | OUTPUT |
|---|---|---|
| 0 | 0 | 0 |
| 0 | 1 | 1 |
| 1 | 0 | 1 |
| 1 | 1 | 0 |

United States Patent Office 3,466,632

Patented Sept. 9, 1969

3,466,632

ASSOCIATIVE MEMORY DEVICE

Chu Ping Wang, Putnam Valley, N.Y., assignor to International Business Machines Corporation, Armonk, N.Y., a corporation of New York Filed Dec. 7, 1966, Ser. No. 599,957

Int. Cl. G11b 5/00

U.S. Cl. 340—174 4 Claims

This invention relates to associative memory devices which employ magnetic films as storage elements.

Associative memories, or "content-addressable" memories as they often are called, are adapted to match selected patterns of interrogating bits with the bit patterns of words stored in memory. By this technique it is possible to find a particular stored information word without knowing its location or "address" in the memory system. Associative memories are able to perform many useful functions, such as arithmetic operations, or the decoding of control bit patterns into signals on control lines which are selected according to the storage locations of the matching words. Another potential use of associative memories is in information retrieval work.

Prior associative memories have not been able to attain high operating speeds without a considerable sacrifice of storage capacity; or conversely, they have had to sacrifice speed if large storage capacity were desired. Moreover, such memories generally have not been well adapted for production by large-scale batch fabrication methods, and their drive current requirements have been such that they could not be used with integrated circuit drivers.

A general object of the present invention is to provide an improved associative memory construction that overcomes the disadvantages of prior associative memory schemes.

A further object is to provide an improved high-speed associative memory which utilizes magnetic film storage elements in such a way that they can be interrogater nondestructively in parallel bit-by-bit (as well as parallel-by-word) fashion using only low drive currents.

A still further object is to provide an improved high-speed associative memory array that can be produced by batch fabrication techniques such as evaporation and electroplating.

The basic memory cell contemplated by this invention comprises a pair of magnetic films arranged in magnetostatically coupled relation, one of these films being a storage film (also known as a "bias" film) having a high coercive force, and the other film being a read film (also known as a "soft" film) having a relatively low coercive force but also having a well-defined anisotropy. The respective easy axes of these films are disposed in orthogonal relationship, and the storage film normally biases the read film so that the latter is magnetized along its hard axis. The film pair is interrogated by applying to it a bit-disturb field which is directed one way or the other along the hard axis of the read film, according to whether the cell is being interrogated for a stored ONE or a stored ZERO. If there is a mismatch, the effective magnetization of the read film is reduced, thereby inducing a mismatch signal on a match detection line to which the read film is magnetically coupled when it is in its fully biased state. Mismatch signals of opposite senses appearing on the same match detection line are oriented so that they aid each other rather than cancelling each other, thereby preventing false match indications. This is accomplished in part by arranging the bit storage cells in duplicate sets and by interrogating one of these sets for ONES only and the other set for ZEROS only. The storage film has properties such that its magnetization is not materially disturbed by those fields which are applied only along its easy axis (i.e., the nondestructive read or interrogate fields). Hence, it is able to restore the hard-axis magnetization of the read film following each nondestructive interrogation thereof. The memory also can be used as an addressable type of nondestructive readout (NDRO) memory by utilizing the match detection line of each word as a word interrogation line.

The foregoing and other objects, features and advantages of the invention will be apparent from the following more particular description of preferred embodiments of the invention, as illustrated in the accompanying drawings wherein:

FIG. 4 is a diagram representing the manner in which the associative memory cells and their related circuit lines may be arranged to accomplish parallel-by-bit interrogation.

FIG. 5 graphically represents the manner in which the cells of each set are interrogated for ONE or ZERO, respectively.

FIG. 6 is a table showing the output of a memory cell under various conditions of interrogation.

Figures 1, 2:
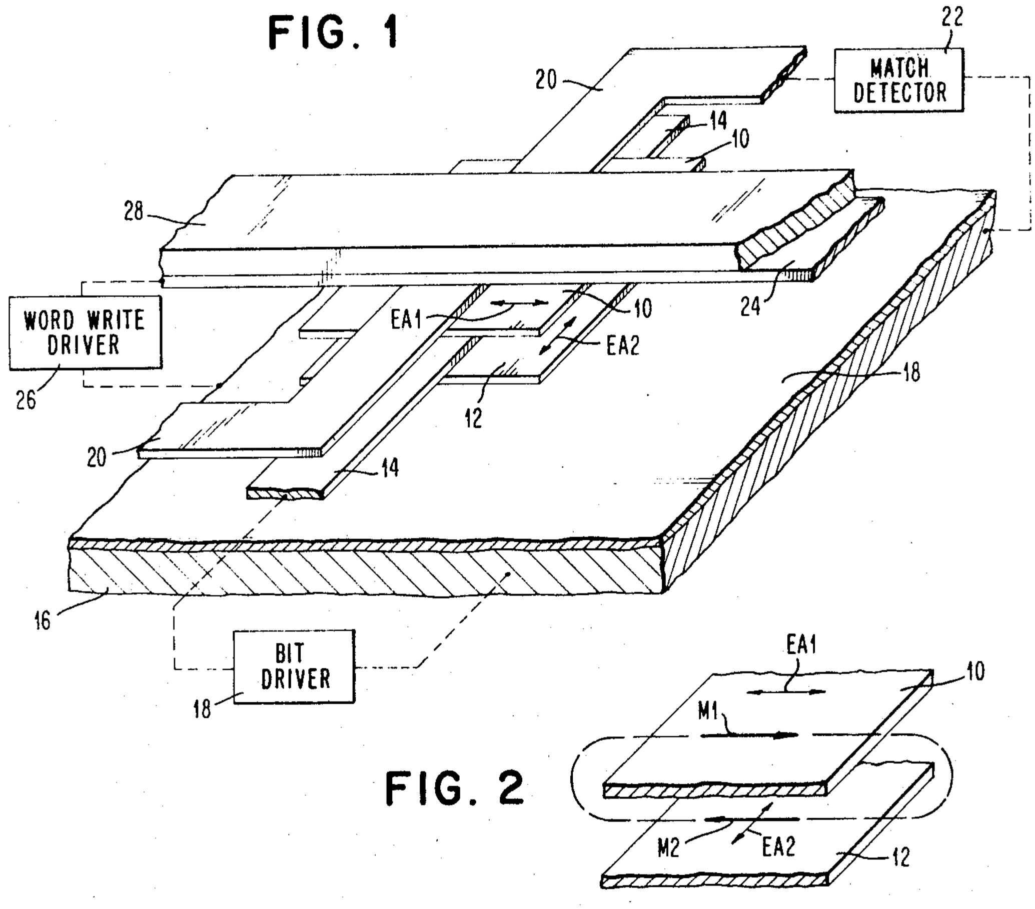
FIG. 1 is a schematic perspective showing of an illustrative memory cell embodying the invention.
FIG. 2 is a simplified perspective representation of the two coupled films in the aforesaid memory cell, showing the relationship of their respective easy axes and the normal directions of magnetization of these films.

FIG. 1 schematically represents a portion of an associative memory array comprising an individual memory cell which is adapted to store a binary ONE bit or a binary ZERO bit, as may be desired. This cell includes two anisotropic magnetic films 10 and 12 (also represented fragmentarily in FIG. 2), which are arranged respectively above and below an intermediate conductive strip 14 commonly referred to as a "bit line" (or in some instances as a "bit-sense line," for reasons which will become apparent hereinafter). The films 10 and 12 are made of suitable ferromagnetic materials such as nickel-iron or nickel-iron-cobalt alloys. Film 10, herein identified as a storage film or "bias" film has relatively high coercivity, and its easy axis EA1 extends at right angles to the bit line 14. This so-called "easy-axis" of the film is the axis along which the magnetic dipoles of the material normally tend to align themselves in the absence of an applied external field. The film 12, herein referred to as the read film or "soft" film, has relatively low coercivity, but it has a definite easy axis EA2 which is disposed parallel with the bit line 14, that is, at right angles to the easy axis EA1 of the storage film 10.

Each of the films 10 and 12 has a so-called "hard" axis extending at right angles to the easy axis of that film. To have the magnetization of such a film directed along this hard axis, the film must be subjected to a hard-direction magnetic bias in excess of its anisotropy field, $H_K$. Normally the remanent magnetization vector M1, FIG. 2, of the storage film 10 extends parallel with the easy axis EA1 of this film, and the remanent magnetic flux of film 10 is partially closed through the film 12, where it extends parallel with the hard axis of the film 12. The magnetization M1 of film 10 dominates the magnetization of film 12, so that normally the magnetization M2 of film 12 is directed entirely at right angles to the easy axis EA2 of that film as shown in FIG. 2.

Figure 3A:
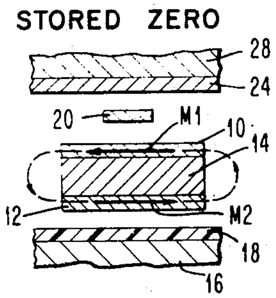
FIGS. 3A and 3B are partially exploded sectional views representing with greater accuracy the manner in which the parts of the memory cells are arranged and the respective film magnetizations for the "stored ZERO" state and the "stored ONE" state, respectively.
Figure 3B:
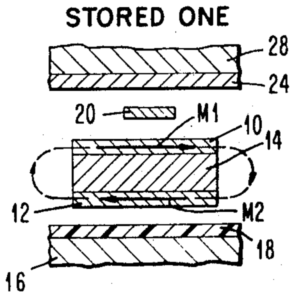

In FIG. 1, the bit line 14 positioned between the films 10 and 12 is represented as being narrower than it normally would be in practice, in order to enhance the clarity of this view. Also, the films 10 and 12 are represented as discrete films which are individual to the bit storage cell under consideration. In practice, it may be more convenient to make the films 10 and 12 in the form of elongated strips paralleling the bit line 14, and as shown in FIGS. 3A and 3B, the conductive strip 14 may be of the same width as the film strips 10 and 12 between which it is sandwiched. The particular fabrication techniques whereby this structure is achieved are well-known and are not germane to the present invention. It is optional whether the edges of the films 10 and 12 are separated by air gaps, as shown herein, or whether they are provided with magnetic metal edge closures to reduce the overall reluctance of the magnetic path through the two films.

The memory array is assembled on a metallic ground plane 16, the upper surface of which is covered by a suitable insulating layer 18. The ground plane 16 serves not only as a structural supporting member but also as a common return path for various currents that pass through the array lines associated with each memory cell. For example, each bit line 14 is connected on one side thereof to a bit driver such as 18, FIG. 1, and the opposite side of this bit driver is connected to the ground plane 16. The remote end of the strip 14 is connected by suitable coupling means (not shown) to the ground plane 16. Hence, the bit driving circuit constitutes, in effect, two parallel conductive paths 14 and 16, between which the lower film 12 is sandwiched. Hence, when a bit current pulse is sent through the line 14 for interrogation purposes, as will be described hereinafter, the bottom film 12 (being positioned between the forward and return current paths) experiences a much greater portion of the interrogating field than the top film 10, which is not sandwiched within this loop and remains undisturbed by the bit pulse. This facilitates the use of the storage device as an associative memory cell or as a nondestructive readout (NDRO) memory cell as will be explained presently.

FIGS. 3A and 3B represent in a partially exploded manner the vertical relationships of the constituent members of the memory cell illustrated in FIG. 1. FIG. 3A shows the directions of the magnetization vectors M1 and M2 of the top and bottom films 10 and 12, respectively, when the cell is storing ZERO, while FIG. 3B represents the respective directions of the magnetization vectors when the cell is storing ONE. Positioned above the top film 10 is a conductive strip 20 which serves as a match detection line for the particular word storage register within which the illustrated bit storage cell is included. The portion of the match detection line 20 which is magnetically coupled with the films 10 and 12 extends parallel with the easy axis EA2 of the bottom film 12, that is, at right angles to the easy axis EA1 of the top film 10. The overall configuration of the match detection line 20 is only partially indicated in FIG. 1 and will be described more fully hereinafter. The match detection line 20 eventually terminates in a suitable match detector 22, FIG. 1, the opposite terminal of which is connected to the ground plane 16 as indicated. The function of the match detection line 20 is to furnish a signal indicating any material change in the net magnetization of the memory films 10 and 12 when an interrogation pulse is sent through the bit line 14. Under certain conditions the line 20 also may serve as a word read line for NDRO memory operations, as will be explained subsequently herein.

Positioned above the match detection line 20, and extended parallel with the easy axes EA1 of all the top films 10 in any given word storage register, is a conductive strip 24 designated the "word write" line. The word write line 24 and the bit line 14 are used conjointly for writing new information into the memory cell by the well-known coincident-current orthogonal writing technique. Thus, when a new binary bit is to be written into the illustrated memory cell, a word write driver 26 sends a relatively strong pulse of current through the word write line 24, and concurrently therewith the bit driver 18 applies to the bit line 14 a current pulse having a polarity determined by the binary ONE or ZERO value of the information bit which is to be stored in the cell. This type of action occurs in each of the memory cells associated with the particular word write line 24 under consideration. The word write pulse passing through the line 24 applies to each associated pair of films 10 and 12 a magnetic field which is strong enough to rotate the magnetization vectors of both the films 10 and 12 into a direction at right angles to the line 24. The bit pulse on the line 14 has a time-overlapped relationship with the word write pulse in the line 24, so that the bit pulse terminates subsequently to the termination of the word write pulse. The bit field supplied by the line 14 is orthogonal to the word write field, and it is effective upon termination of the latter to rotate the magnetization vector M1 of film 10 into one or the other of the portions thereof illustrated in FIGS. 3A and 3B, according to whether a ONE or ZERO bit is being stored in the memory cell. The stray flux from the top film 10 then biases the magnetization M2 of the bottom film 12 into a position which is antiparallel to that finally occupied by the upper film vector M1 when quiescent conditions are restored.

In order to enhance the magnetizing action of the word write line 24, it is customary to provide this strip 24 with a magnetic strip or layer 28 known as a "keeper," through which any stray magnetic flux of the films 10 and 12 can be partially closed at times while these films are being magnetized by the word write field or at any other time when the flux of either film is not completely closed through the other film. The keeper 28 is not involved in the quiescent magnetic states of the memory device which are depicted in FIGS. 3A and 3B, wherein the antiparallel flux vectors M1 and M2 of the top and bottom films are substantially completely closed through each other.

FIG. 4 represents schematically the manner in which the memory cells and their associated array lines would be arranged in a memory system embodying the principle of the invention. For a purpose which will be explained presently, the memory cells are arranged in pairs or duplicate sets. For example, in the row of memory cells designated "Word A" in FIG. 4, the first bit storage position in the register is occupied by a pair of memory cells A1 and A1′ which respectively store the first digit of this word in duplicate. Additional pairs of cells such as A2 and A2′ on this word line are provided for duplicate storage of the remaining digits of this word. In the "Word B" row, a similar arrangement of cells B1, B1′, B2, B2′, and so forth is provided. In an actual memory construction, of course, the array would include many more word lines and bit lines than those shown in FIG. 4.

Both the match detection lines 20 and the word write lines 24 extend generally in the directions of their respective word rows, as shown in FIG. 4. However, the lines 20 include offset portions so that they cross the respective memory cells such as A1, A1′, etc., in directions parallel with the bit lines such as 14. In practice, suitable anti-noise coupling arrangements (not shown herein) would be provided.

Each of the cells as A1 or A1′ is constructed in the manner shown in FIG. 1. That is to say, each of these cells comprises a pair of top and bottom films such as 10 and 12 and associated array lines such as 14, 20 and 24. The bit lines for those cells that have prime suffixes in their reference numbers are designated 14′. When a binary bit or digit is to be written into a pair of cells such as A1 and A1′, the bit lines 14 and 14′ associated with these cells are driven by their respective bit drivers 18 and 18′ to cause identical representations of the same digit to be stored in the two cells A1 and A1′ of this pair. This action, of course, takes place in coincidence with the energization of the respective word write line 24, thereby to cause the appropriate rotational switching of the films to occur as explained hereinabove. Similar actions occur in the other memory cells of this word line, so that each pair of cells as A1 and A1′ (or A2 and A2′, as the case may be) now stores identical representations of the same digit. As described, thus far, the functions of the bit lines 14 have been identical with those of the bit lines 14′. During an interrogation, however, the respective operations of the bit lines 14 and 14′ will differ as explained below.

ASSOCIATIVE MEMORY OPERATION

During an associative memory or content addressing operation, the various bit lines 14 and 14′ are selectively pulsed in accordance with the pattern of bits which is being searched. This bit patern may constitute all of the bits in a given search word, or it may be a bit pattern of smaller size known as a "tag." All of the stored words are searched simultaneously and in parallel to locate the word or words which contain the desired bit pattern; moreover, all of the bits in the search pattern are presented simultaneously and in parallel to the stored words. The present arrangement is such that the bit lines 14 are utilized to interrogate for the presence of ONES in their respective bit positions, and the bit lines 14′ are employed to interrogate for the presence of ZEROS in their respective bit positions.

FIG. 5 represents the hard-axis magnetization characteristics of the read films in two paired cells as A and A′, which could correspond, for example, to the cells A1 and A1′ shown in FIG. 4. If it is desired to interrogate this particular bit position for the presence of a stored ONE, a positive pulse is applied to the associated bit line 14, and no pulse is applied to the associated bit line 14′. If the two cells A and A′ are storing "ONE" representations, there will be no perceptible change in the cell magnetization when the same is interrogated for ONE. If, on the other hand, the cells A and A′ are storing ZERO representations, then the application of a ONE interrogation pulse on the bit line 14 sets up a field which is opposed to the magnetization of the read film (i.e., the film 12 shown in FIG. 1 or 2), and the magnetization of this read film therefore is reduced. However, the magnetization of the storage film such as 10, FIG. 1, is not materially effected by the interrogation pulse on the bit line 14 because the film 10 has higher coercivity than the film 12, and it also is located above the bit line 14 rather than being sandwiched between this bit line and its corresponding return path through the ground plane 16. Inasmuch as the magnetization of the read film 12 has been reduced, whereas the magnetization of the storage film 10 is substantially unaffetced, there now is a substantial increase in the net magnetic flux from the two films linking the match detection line 20. As a result of this, a mismatch signal is induced in that portion of the match detection line 20 which is disposed in proximity to the films 10 and 12.

A similar action occurs if a pair of cells is storing ONE while being interrogated for the presence of ZERO. To interrogate for ZERO, the bit line 14′ is pulsed negatively, and the associated bit line 14 is not pulsed. Referring again to FIG. 5, the magnetization of the read film in cell A′ is reduced by the ZERO interrogation pulse, causing the net magnetization of the cell A′ linking the match detection line 20 (FIG. 4) to be reduced, thereby generating a mismatch signal on the line 20. On the other hand, if a cell such as A′ stores ZERO and is interrogated for ZERO, no mismatch signal is produced.

It is evident that the mismatch signal which is produced when a cell storing ZERO is interrogated for ONE will differ in polarity from the mismatch signal that is produced when a cell storing ONE is interrogated for ZERO. Both types of mismatches could occur in the same word row. However, because of the manner in which the match detection lines of the memory are arranged and operated, all mismatch signals on the same match detection line 20 will be in aiding relationship to each other. It may be noted in FIG. 4 that the match detection line 20 in the "Word A" row, for instance, crosses the cells such as A1 and B1 from top to bottom, as viewed in this figure, whereas it crosses the cells A1′ and B1′ from bottom to top, as viewed in this figure. Cells such as A1 and B1 generate mismatch signals only if they store ZERO and are interrogated for ONE. Cells such as A1′ and B1′ generate mismatch signals only if they store ONE and are interrogated for ZERO. In either event, the polarities of the respective mismatch signals are compatible with each other so that there is no mutual cancellation of mismatch signals. If it were not for this feature, mismatch signals of opposite types could cancel each other to give a false match indication (or absence of signal) on the match detection line 20.

The table set forth in FIG. 6 summarizes the operation of each pair of cells under different conditions of interrogation. In the "output" column, 0 indicates no output signal and 1 indicates an output signal. There is no differentation between the two types of output signals corresponding to the two types of mismatch conditions for the reason explained hereinabove.

From the foregoing description it is apparent how the principle of the invention can be utilized to provide an associative memory in which the entire contents can be searched in parallel-by-bit fashion within a single memory cycle. The construction of the illustrated device is compatible with the existing batch fabrication technologies, such as vacuum deposition and electroplating, which have been proposed for the large-scale production of memory systems. The illustrated memory device furthermore has the advantage that its drive current requirements are very low; hence the array lines can be energized by monolithic semiconductor drivers of the type used in integrated circuitry. All operations are performed at high speed because of the coupled-film techniques employed herein and the fact that thin films are employed as memory elements.

NDRO MEMORY OPERATION

In addition to functioning as an associative memory, the illustrated apparatus also can be operated as an addressable NDRO (nondestructive-readout) memory system. The match detection line 20, FIG. 1, serves as a word read line during NDRO operations. This read line 20 is pulsed (by means not shown) to produce a field along the easy direction of the top film 10, the magnitude of this field being restricted to a value smaller than the coercivity of the film 10. The information stored in the film 10 therefore remains undisturbed. The read film 12 is biased into saturation along its hard axis, and if its magnetization is opposed by the read film, there is a reduction in the net flux linking the bit line 14. Match detector 22 is not used in this instance. During NDRO operation the bit line 14 also serves as a sense line, hence it may be called a "bit-sense line" in this instance. A sense amplifier (not shown) is connected to the bit-sense line 14, suitable switching means being provided so that either the sense amplifier or the bit driver 18, not both, will be effectively coupled to the bit-sense line 14 at any particular time, according to whether a read operation or a write operation is being performed. The arrangement is such that when the read line 20 is pulsed, a sense signal is produced on the line 14 if the memory cell is storing a ONE, and no sense signal is produced if the memory cell is storing ZERO. When the read pulse terminates, the magnetization of the read film 12 is restored to its original state under the influence of the bias film 10.

In the NDRO mode of operation, the writing of new information into the memory cell is performed in substantially the same manner as described hereinabove for the associative memory mode of operation. That is to say, a word write pulse is applied to the word write line 24 in conjunction with a bit write pulse applied on the bit line 14. In this process the information bit previously stored in the memory cell is destroyed and replaced by a new information bit. Thereafter, nondestructive interrogation can be performed as many times as desired until the next writing operation.

While the invention has been particularly shown and described with reference to preferred embodiments thereof, it will be understood by those skilled in the art that the foregoing and other changes in form and details may be made therein without departing from the spirit and scope of the invention.

What is claimed is:

1. A magnetic memory array capable of being nondestructively interrogated comprising:
   memory cells arranged in word rows and bit columns, each of said cells comprising first and second anisotropic magnetic films in magnetically coupled relationship with each other,
      the first film of each cell being a storage film with relatively high coercivity and having an easy axis that extends in the general direction of its word row,
      the second film of each cell being a read film with relatively low coercivity and having an easy axis that is substantially at right angles to the easy axis of the associated storage film, said read film being magnetically biased by the associated storage film so that normally the magnetization of said read film is directed along its hard axis in antiparallel relation with the remanent magnetization of said storage film,
      the memory cells in each of said word rows being further arranged in pairs, each such pair of cells being disposed respectively in two separate columns and both such cells relating to the same bit storage position in the array,
   a bit interrogating means including the following elements:
      bit lines respectively extending along at least some of said columns substantially at right angles to the easy axes of the storage films in the array, each such bit line being inductively coupled to the storage films and read films of the memory cells in its respective column, said bit lines being arranged in pairs, one such pair for each respective bit storage position in a word or predetermined portion thereof, and
      bit drivers for the respective bit lines operable selectively to interrogate the memory cells in the respective columns for stored ONES and ZEROS, said bit drivers being arranged in two sets, of which one set is operable to pulse its associated bit lines selectively with ONE interrogating pulses, and the other set is operable to pulse its associated bit lines selectively with ZERO interrogating pulses, the bit lines in each pair thereof being driven respectively by bit drivers of the two sets,
   and a plurality of detection lines, one for each word row, each of said detection lines having portions thereof respectively coupled to the respective memory cells of its row for generating signals in response to changes in the net magnetic flux linking any of such portions, said portions being arranged substantially at right angles to the easy axes of their respective storage films.

2. A magnetic memory array as set forth in claim 1 wherein the several portions of each detection line are so related to each other that mismatch signals induced therein when stored digits do not match their interrogating digits have compatible polarities, regardless of whether such signals result from the interrogation of stored ZEROS for ONES or stored ONES for ZEROS, thereby preventing the occurrence of false match indications whenever equal numbers of mismatches of opposite senses occur in the same word row.

3. A magnetic memory array as set forth in claim 1 including a conductive substrate which serves as a current return path for all of said bit lines, the read films of said memory cells being disposed between said substrate and their respective bit lines, and said bit lines being disposed between their respective read films and the associated storage films.

4. A nondestructive readout memory array of the type set forth in claim 1 wherein said detection lines also are adapted to serve as word interrogating lines, and said bit lines also are adapted to serve as bit sense lines.

References Cited

UNITED STATES PATENTS

| | | | |
|---|---|---|---|
| 3,179,928 | 4/1965 | Sorensen | 340—174 |
| 3,188,613 | 6/1965 | Fedde | 340—174 |
| 3,193,806 | 7/1965 | Pohm et al. | 340—174 |
| 3,195,108 | 7/1965 | Franck | 340—146.2 |
| 3,305,846 | 2/1967 | Amemiya | 340—174 |

BERNARD KONICK, Primary Examiner

K. E. KROSIN, Assistant Examiner